United States Patent [19]

Skretting et al.

[11] Patent Number: 5,245,184

[45] Date of Patent: Sep. 14, 1993

[54] TRANSMISSION PHANTOM FOR TOTAL PERFORMANCE ASSESSMENT OF SCINTILLATION CAMERA IMAGING AND METHOD OF MANUFACTURE

[76] Inventors: Arne Skretting, Askroken 14A, N-1300 Sandvika; Elin Strandmyr, Ringgaten 4B, N-0577 Oslo 5, both of Norway

[21] Appl. No.: 777,254

[22] PCT Filed: May 25, 1990

[86] PCT No.: PCT/NO90/00095

§ 371 Date: Jan. 24, 1992

§ 102(e) Date: Jan. 24, 1992

[87] PCT Pub. No.: WO90/14602

PCT Pub. Date: Nov. 29, 1990

[30] Foreign Application Priority Data

May 26, 1989 [NO] Norway .................. 892150

[51] Int. Cl.$^5$ .................................. G01T 1/164
[52] U.S. Cl. ........................ 250/252.1; 378/18
[58] Field of Search ............ 250/252.1, 505.1; 378/18, 207

[56] References Cited

U.S. PATENT DOCUMENTS

| | | | |
|---|---|---|---|
| 4,408,124 | 10/1983 | Paras | 250/252.1 |
| 4,419,577 | 12/1983 | Guth | 250/252.1 |
| 4,499,375 | 2/1985 | Jaszczak | 250/252.1 |
| 4,655,716 | 4/1987 | Hoevel | 378/18 |
| 5,056,130 | 10/1991 | Engel | 378/18 |

FOREIGN PATENT DOCUMENTS 0402070 10/1973 U.S.S.R. .............. 250/252.1 R

OTHER PUBLICATIONS

FDA "Quality Control for Scintillation Cameras" U.S. Dept. of Health, Ed. & Welfare (Jun. 1976).
European Journal of Nuclear Medicine, G. N. Souchkevitch, et al. The World Health Organization and International Atomic Energy Agency, etc. 1988.

*Primary Examiner*—Paul M. Dzierzynski
*Assistant Examiner*—Richard Hanig
*Attorney, Agent, or Firm*—Natter & Natter

[57] ABSTRACT

A transmission phantom for total performance assessment of scintillation camera imaging has a constant thickness and at least two layers of homogenous material each layer having different radiation attenuating properties. A layer having a moderate attenuation provides relief areas and a radiation absorbing layer conforming to the relief areas provides for variable transmission through the phantom corresponding to the thickness of the absorbing layer to simulate pathological conditions in a patient. The method of manufacture includes the preparation of a relief mold including a bottom plate and side walls. The radiation absorbing material is poured into the mold, allowed to hardened and milled to a flat surface.

11 Claims, 1 Drawing Sheet

TRANSMISSION PHANTOM FOR TOTAL PERFORMANCE ASSESSMENT OF SCINTILLATION CAMERA IMAGING AND METHOD OF MANUFACTURE

BACKGROUND OF THE INVENTION

1. Field of the Invention

The invention concerns the necessary physical and chemical composition and construction of a transmission phantom for total performance assessments in scintillation camera imaging. In particular, the transmission phantom of this invention concerns the simulation of complex distribution patterns of radionuclides, for example, as obtained in bone scintigraphy. When placed on top of a uniform source of radioactivity, the phantom creates a photon intensity distribution directed towards the detector that is equivalent to that which is observed in a patient study. The design technique also enables simulations of studies where there are complex distributions of radioactivity within the human body in front of the camera, e.g. in bone scintigraphy. The invention further concerns a method for mass production of this phantom.

2. Description of the Related Art

A scintillation camera (gamma camera) is currently used in nuclear medicine to acquire images of photon-emitting radionuclides distributed within the patients body following an intravenous injection, after breathing a radioactive gas or after an oral intake of radionuclides. Such cameras are used in most larger hospitals. In Norway they are used in 23 hospital laboratories. Artificially produced radionuclides are used, and they are required to be photon-emitters and have relative short half lives.

These cameras perform an indirect imaging, in the sense that the detection process is based on electronic circuits that must be correctly adjusted if artificial structures (artefacts), not related to the distribution of radionuclides, shall be avoided. Most laboratories therefore posess simple constructions made of lead to be used together with radioactive sources for monitoring camera quality.

Devices for quality control of scintillation cameras are previously described. U.S. Pat. No. 4,408,124 comprises a lead plate, impervious to gamma rays, with an orthogonal array of apertures sandwiched between two rectangular sheets of lucite, while U.S. Pat. No. 4,419,577 comprises a radiation transparent, closed, planar body member with internal mercury-filled communication passages that define a calibrated radiation opaque test pattern. These devices are suitable for testing scintillation camera performance (uniformity, linearity, intrinsic resolution). They do, however, not simulate the complex distribution of radioactivity in a patient since, 1) the gamma impervious lead plate in U.S. Pat. No. 4,408,124 is of constant thickness, and the apertures are of uniform size; and 2) the low attenuating body member in U.S. Pat. No. 4,419,577 is planar, of constant thickness, and the mercury bars all have uniform thickness and attenuation, and thus represent only two levels of transmission (mercury bar/lucite, lead plate/apertures).

From the literature, hollow containers, filled with radioactive solutions are known, and in which objects of different materials may be inserted to displace the radioactive solution and thereby simulate uptake defects. Also, simple transmission phantoms have been built as combinations of several layers of absorptive material (e.g. copper). By the use of a uniform source behind such a phantom, a transmitted photon intensity distribution resembles that obtained in a patient study. None of these constructions re suited for simulations of more complex distributions of radioactivity in the patient, such as when the radionuclides are accumulated in bone tissues.

SUMMARY OF THE INVENTION

The object of the present invention is thus to construct transmission phantoms which, together with radioactive sources, simulate the complex distribution of radioactivity in patients. This is obtained by the transmission phantom of the present investigation as it is characterized by the patent claims.

In the present invention the transmission varies continuously over the phantom surface in such a manner that the resulting image contains a wide variety of image intensities. Thus the transmission phantom of the present invention allows the laboratory to test their own diagnostic procedures.

By means of the present method, the transmission phantom can be designed in such a way that it most exactly simulates the photon intensity distribution obtained in static studies, i.e. studies, in which there is no time variation of the radioactivity distribution during the examination time. We have already registered a certain demand for such a phantom in the market and concluded that a mass production is feasible with relatively simple means.

DESCRIPTION OF THE PREFERRED EMBODIMENT

Figure 1:
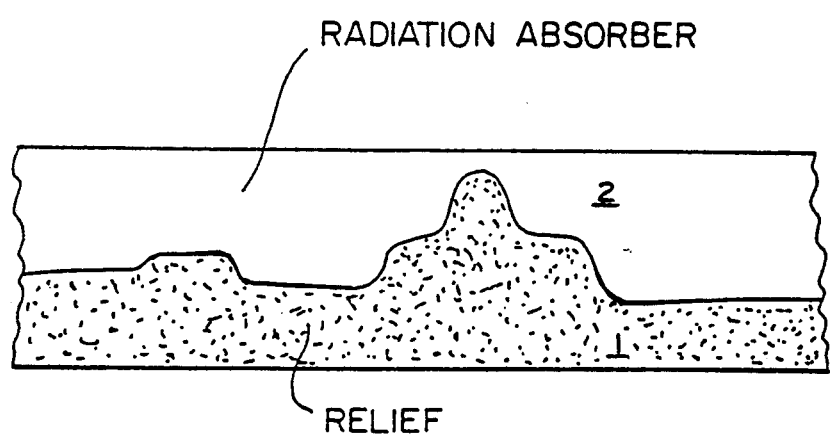
FIG. 1 is a cross-sectional through an elevational view of the transmission phantom of this invention showing relief areas of varying thickness formed from a layer of material having low radiation attenuating properties and a covering layer of radiation absorbing material conforming to hte relief areas.

The method of production consists of construction, after careful measurements of image intensities in the image to be simulated and calculations of absorbancies, of a relief a, from a material with low radiation attenuation properties (different types of plastics, epoxy resins, polyacrylate etc). The relief is modelled in clay.

This relief 1 is covered to a certain thickness with a mixture 2, characterized by a considerably greater attenuation. This composition consists of barium sulphate powder mixed with a two-component epoxy resin (Ciba-Geigy) of specific viscosity. The epoxy is prepared before the barium sulphate powder is added, and the composition subjected to vacuum for a short time in order to remove air bubbles. Following hardening of the epoxy the phantom is processed by a milling cutter in order to produce a flat surface. Barium in a different chemical compound or other elements characterized by sufficiently high atomic number in appropriate compounds may also be used. Other compounds can substitute the epoxy as a binder. Thus the transmission phantom, due to the pre-prepared relief 1 with a thickness pattern reflecting a radioactive emission pattern from a patient in such a way that when the relief 1 is thick the adjacent layer of attenuating material 2 will be thin, with a reduced attenuation and consequently low absorption of photons emitted from the source behind the phantom.

The varying thickness of the absorbing material 2 produces varying intensity of photons transmitted towards the detector of the scintillation camera. The resulting image very closely resembles that obtained in a patient study. Illnesses producing different concentrations of radioactivity or uptake defects (less local activity) can be simulate by appropriate changes of the relief 1 height.

Mass production is effectuated by making a casting of the clay relief, either by using epoxy together with an appropriate slip material, or constructing special tools for pressing plastics. The relief may be built up in epoxy resin or different types of plastics, characterized by satisfactory absorption qualities.

The final product is formed like a block, measuring in the present version 40×40 cm (bigger phantom is possible) with a maximum thickness of 5 cm. It may be applied in combination with a uniform source of radioactivity for education of personel, optimalization of imaging and display techniques, verification of computer image processing and for constancy testing of the equipment. The phantom may contain sets of plugs having different attenuation properties which can be used to vary the contrast between the normal structures and the simulated pathological areas. The standard version of the phantom comprises a larger number of simulated accumulations and uptake defects.

I claim:

1. A transmission phantom for total performance assessment of scintillation camera imaging by measurement of photon transmission through the phantom, said phantom having a substantially uniform thickness comprising a first layer of low radiation attenuating material, said first layer being formed with selected contours defining relief areas, a second layer of material conforming to the relief areas of the first layer, said second layer being adapted to absorb radiation and to provide variable distribution intensity of photon transmission in correspondence with the shape of the relief areas to thereby simulate pathological images.

2. A transmission phantom as claimed in claim 1 wherein the second layer is comprised of a homogenous mixture including a barium compound and a binder.

3. A transmission phantom as claimed in claim 2 wherein the barium compound is barium sulphate powder.

4. A transmission phantom as claimed in claim 2 wherein the binder is an epoxy resin.

5. A method for manufacturing a transmission phantom for total performance assessment of scintillation camera imaging comprising the steps of:
   determining relief areas for effecting a selected distribution of photon transmission through the phantom corresponding to image intensities in a pathological image to be simulated,
   forming a firs layer of a low radiation attenuating material defining the relief areas, and
   covering the first layer with a radiation absorbing material to form a second layer.

6. A method for manufacturing a transmission phantom as claimed in claim 5 wherein the first layer is formed of a plastic material.

7. A method for manufacturing a transmission phantom as claimed in claim 5 wherein the second layer is formed of a settable viscous composition containing barium.

8. A method for manufacturing a transmission phantom as claimed in claim 7 wherein the composition is vacuum treated to remove entrained air bubbles before setting.

9. A method for manufacturing a transmission phantom as claimed in claim 7 including the further step of mechanically treating the composition after setting to produce a flat surface.

10. A method for manufacturing a transmission phantom as claimed in claim 5 further including the step of preparing a mold defining the relief areas and pouring the radiation absorbing material into the mold.

11. A method for manufacturing a transmission phantom as claimed in claim 10 wherein the relief areas are molded from clay.

* * * * *